US009531298B2

United States Patent
Wang et al.

(10) Patent No.: US 9,531,298 B2
(45) Date of Patent: Dec. 27, 2016

(54) INVERTER DEVICE

(71) Applicant: FUJI ELECTRIC CO., LTD., Kawasaki (JP)

(72) Inventors: Qichen Wang, Hino (JP); Satoru Fujita, Tachikawa (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 131 days.

(21) Appl. No.: 14/661,499

(22) Filed: Mar. 18, 2015

(65) Prior Publication Data
US 2015/0194908 A1 Jul. 9, 2015

Related U.S. Application Data

(63) Continuation of application No. PCT/JP2012/007199, filed on Nov. 9, 2012.

(51) Int. Cl.
*H02M 7/537* (2006.01)
*H02M 7/483* (2007.01)

(52) U.S. Cl.
CPC .............. *H02M 7/537* (2013.01); *H02M 7/483* (2013.01)

(58) Field of Classification Search
None
See application file for complete search history.

(56) References Cited

U.S. PATENT DOCUMENTS 4,742,441 A * 5/1988 Akerson ............... H02M 7/538
363/127
2011/0051478 A1 3/2011 Sato et al.
(Continued)

FOREIGN PATENT DOCUMENTS

JP 4-236171 8/1992
JP 10-75581 3/1998
(Continued)

OTHER PUBLICATIONS

Extended European Search Report dated May 23, 2016 in corresponding European Patent Application No. 12888122.4, 6 pages.
(Continued)

*Primary Examiner* — Timothy J Dole
*Assistant Examiner* — Monica Mata

(57) ABSTRACT

When in an operation mode in which an alternating current voltage Vout is output using a positive voltage V1 of a direct current power source 1 input via a switching element Q1, a negative voltage V2 of the direct current power source 1 input via a switching element Q2, and a zero voltage Vz input via a bidirectional switch element BS1 or an alternating current voltage Vs input via a bidirectional switch element BS2, in the period in which the polarity of the output voltage Vout and the polarity of an output current Iout are the same, a control signal of an element to be caused to perform an on/off operation is generated by being pulse-width modulated using a carrier signal S with a first frequency, and in the period in which the polarity of the output voltage Vout and the polarity of the output current Iout are different, a control signal of an element to be caused to perform an on/off operation is generated by being pulse-width modulated using a carrier signal with a second frequency lower than the first frequency.

16 Claims, 10 Drawing Sheets

(56) References Cited

U.S. PATENT DOCUMENTS

| | | |
|---|---|---|
| 2011/0116293 A1 | 5/2011 | Tabata et al. |
| 2012/0020137 A1 | 1/2012 | Abe |
| 2012/0044728 A1* | 2/2012 | Yatsu .................... H02M 7/219 363/126 |
| 2012/0075899 A1 | 3/2012 | Nishio |
| 2012/0092915 A1 | 4/2012 | Okuda et al. |

FOREIGN PATENT DOCUMENTS

| | | |
|---|---|---|
| JP | 2007-28860 | 2/2007 |
| JP | 2011-61883 | 3/2011 |
| JP | 2012-157187 | 8/2012 |
| WO | WO 2011/013233 A1 | 2/2011 |

OTHER PUBLICATIONS

International Search Report mailed on Feb. 12, 2013 in corresponding International Patent Application No. PCT/JP2012/007199.

* cited by examiner (a) (b) (c)

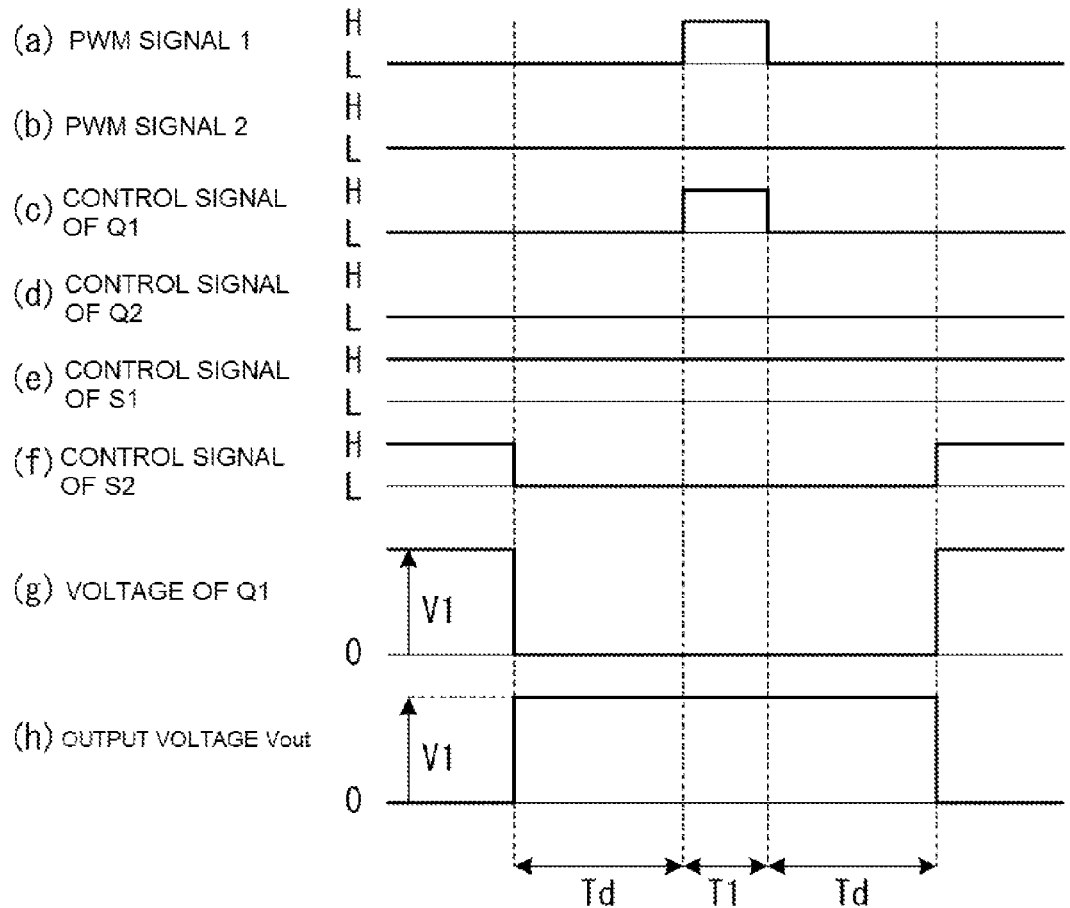

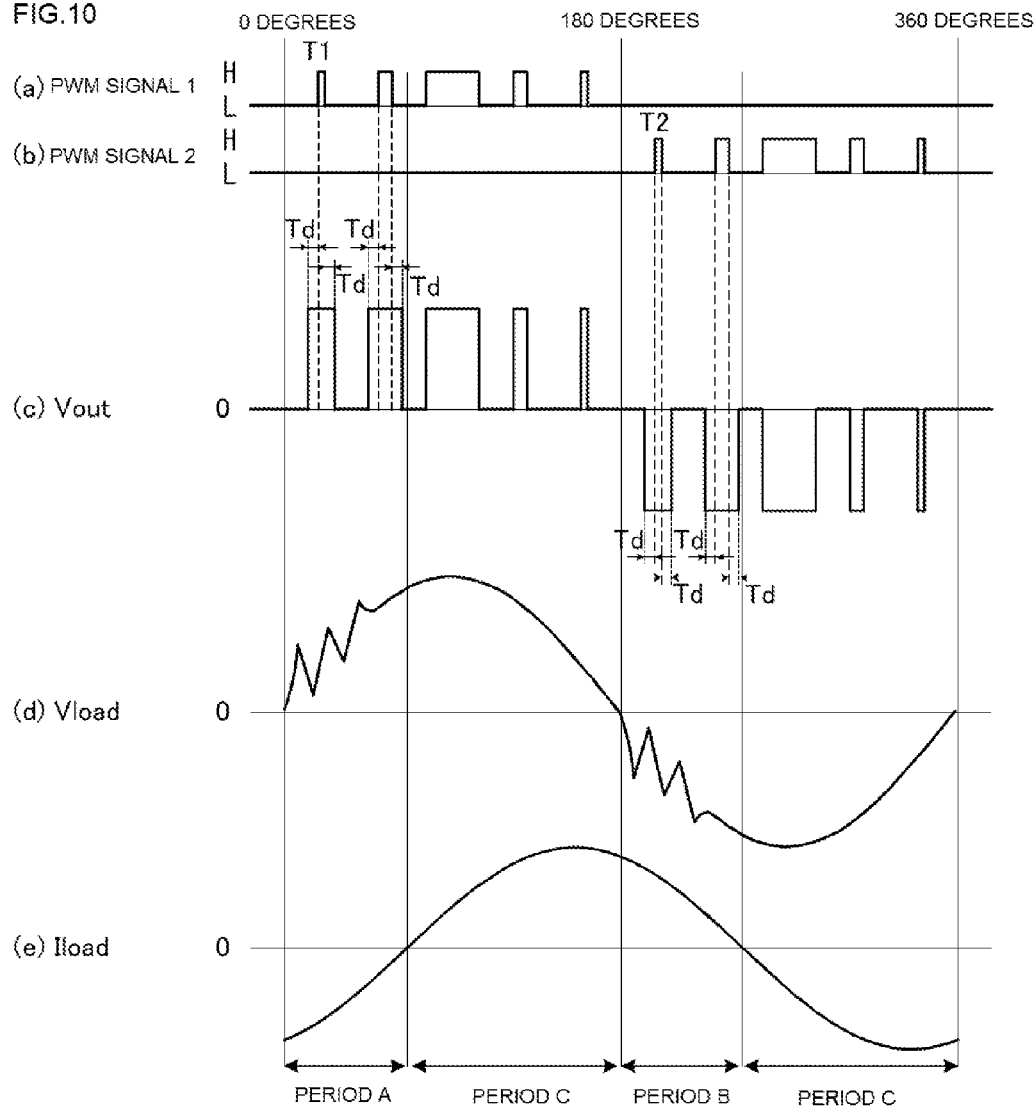

INVERTER DEVICE

CROSS-REFERENCE TO RELATED APPLICATIONS

This is a continuation application, filed under 35 U.S.C. §111(a), of International Patent Application No. PCT/JP2012/007199 filed on Nov. 9, 2012, the disclosure of which is incorporated herein by reference.

BACKGROUND

1. Field

Embodiments of the invention relate to an inverter device which can reduce a waveform distortion of an output voltage even when there is a period in which a current of a phase lagging behind that of an alternating current output voltage flows.

2. Description of Related Art

A three-level inverter device, one phase of which is configured by connecting two switching elements to each of which a diode is connected in anti-parallel and one end of a bidirectional switch at the connection point of these two switching elements, is known (PTL 1). In the three-level inverter device, two switching elements of each phase are connected in series across a direct current power source. Also, the other end of the bidirectional switch is connected to the intermediate potential point of the direct current power source. Further, each element of the three-level inverter device performs an on/off operation based on a control signal pulse-width modulated using an output voltage command and a carrier signal with a higher frequency than the frequency of the output voltage command. As a result of this, the three-level inverter device outputs a pulse-width modulated phase voltage. This kind of three-level inverter device is described in PTL 2.

FIG. 8 is a diagram illustrating a configuration of a U-phase circuit of this kind of three-level inverter device. In FIG. 8, 1 is a direct current power source, 2 is an inverter circuit, 3 is a filter circuit, and 4 is a load. The direct current power source 1 is a power source wherein a positive side power source Psp and a negative side power source Psn are connected in series. The output terminals of the direct current power source 1 are a positive side terminal P of the positive side power source Psp, a negative side terminal N of the negative side power source Psn, and a neutral terminal C which is the connection point of the positive side power source Psp and negative side power source Psn. The positive side terminal P outputs a positive voltage V1 of the positive side power source Psp. The negative side terminal N outputs a negative voltage V2 of the negative side power source Psn. The neutral terminal C outputs a zero voltage Vz (not illustrated) which is the intermediate voltage of the direct current power source 1.

The inverter circuit 2 is configured of switching elements Q1 and Q2 and switch elements S1 and S2. The switching elements Q1 and Q2 are connected in series and connected across the direct current power source 1. The connection point of the switching elements Q1 and Q2 is an output terminal U which outputs an alternating current voltage Vout. The switch elements S1 and S2, being connected in anti-parallel, configure a bidirectional switch BS. The bidirectional switch BS is connected between the neutral terminal C and the output terminal U. The filter circuit 3 is a circuit formed by connecting a reactor Lf and a capacitor Cf in series. The filter circuit 3 is connected between the output terminal U and the neutral terminal C. The load 4 is connected across the capacitor Cf. A sinusoidal load voltage Vload obtained by removing a harmonic component from the output voltage Vout of the inverter circuit 2 is output across the capacitor Cf.

Firstly, a description will be given of an operation of the inverter circuit 2 when outputting the positive load voltage Vload. FIG. 9 is a chart showing the relationship between the control signal of each element and the output voltage Vout. Each element is turned on when the control signal is at a high level (hereinafter "H"), and is turned off when the control signal is at a low level (hereinafter "L").

FIG. 9 part (a) shows a temporal change in a first pulse width modulation signal (a PWM signal 1). The PWM signal 1 is a signal which is a reference for generating the control signals of the switching element Q1 and switch element S2. The PWM signal 1 alternates between H and L. The control signal of the switching element Q1 switches to H or L in synchronism with the PWM signal 1 (FIG. 9 part (c)). The control signal of the switch element S2 is a signal which is inverted between H and L of the PWM signal 1 and to which dormant periods Td are added (FIG. 9 part (f)). The dormant periods Td are periods for turning off both the switching element Q1 and the switch element S2 in order to prevent a short circuit of the switching element Q1 and switch element S2.

FIG. 9 part (b) shows a temporal change in a second pulse width modulation signal (a PWM signal 2). The PWM signal 2 is a signal which is a reference for generating the control signals of the switching element Q2 and switch element S1. The PWM signal 2 is always at L in this period. The control signal of the switching element Q2 is always at L in response to the PWM signal 2 (FIG. 9 part (d)). The control signal of the switch element S1 is always at H in response to the signal which is inverted between H and L of the PWM signal 2 (FIG. 9 part (e)).

When the individual elements perform an on/off operation based on the heretofore described control signals, a positive pulse train voltage Vout is output between the output terminal U and the neutral terminal C (hereinafter "between the terminals U and C"). The voltage Vout is pulse-width modulated, and the amplitude thereof is of the voltage V1 of the direct current power source Psp.

The operation of the U-phase circuit when outputting a negative voltage only has to be considered so as to interchange the operations of the PWM signal 1 and PWM signal 2, interchange the control signals of the switching element Q1 and switching element Q2, and furthermore, interchange the control signals of the switch element S1 and switch element S2. Further, when each element performs an on/off operation based on the control signal, a negative pulse train voltage Vout is output between the terminals U and C. The voltage Vout is pulse-width modulated, and the amplitude thereof is of the voltage V2 of the direct current power source Psn.

As heretofore described, the output voltage Vout is a pulse-width modulated pulse train voltage and includes a harmonic component. The harmonic component included in the output voltage Vout is removed by the filter circuit 3. In the same way, a harmonic component included in an output current Iout of the inverter circuit 2 is removed by the filter circuit 3. As a result of this, the sinusoidal alternating current voltage Vload is applied to the load 4. Also, a sinusoidal alternating current Iload flows through the load 4.

CITATION LIST

Patent Literature

PTL 1: JP-A-2007-028860
PTL 2: JP-A-2011-061883

SUMMARY

Additional aspects and/or advantages will be set forth in part in the description which follows and, in part, will be apparent from the description, or may be learned by practice of embodiments of the invention.

However, with the heretofore described inverter device, when a power factor lagging load such as an LR load is connected thereto, the output current Iout is of a phase lagging behind the output voltage Vout. That is, the period in which the polarity of the output voltage Vout and the polarity of the output current Iout are different exists in the cycle of the output voltage Vout. Further, the heretofore described inverter device cannot output any output voltage Vout corresponding to the PWM signals 1 and 2.

FIG. 10 is a chart for illustrating this kind of problem which the inverter device has. FIG. 10 part (a) is a chart showing a temporal change in the PWM signal 1 in one cycle of the output voltage Vout. Also, FIG. 10 part (b) is a chart showing a temporal change in the PWM signal 2 in one cycle of the output voltage Vout. The PWM signal 1 is a signal which is pulse-width modulated in the period with a control angle of 0 degrees to 180 degrees and is at L in the period with a control angle of 180 degrees to 360 degrees. Meanwhile, the PWM signal 2 is a signal which is at L in the period with a control angle of 0 degrees to 180 degrees and is pulse-width modulated in the period with a control angle of 180 degrees to 360 degrees. When the inverter circuit 2 operates based on the PWM signals 1 and 2, the voltage Vout shown in FIG. 10 part (c) is output.

Herein, the pulse width of the output voltage Vout is a width wherein the dormant periods Td are added before and after each pulse of the PWM signal 1 in a period A. This is because in the period A, when the switch element S2 is turned off, the current Iout flows through a diode connected in anti-parallel to the switching element Q1. Also, the pulse width of the output voltage Vout is a width wherein the dormant periods Td are added before and after each pulse of the PWM signal 2 in a period B. This is because in the period B, when the switch element S1 is turned off, the current Iout flows through a diode connected in anti-parallel to the switching element Q2. In the periods A and B, as the pulse widths commanded for by the PWM signals 1 and 2 are narrow, the waveform distortion of the output voltage Vout resulting from the addition of the dormant periods Td increases. Therefore, a voltage oscillation due to a step change in the output voltage Vout occurs in the filter circuit 3. As a result of this, the oscillation and waveform distortion of the load voltage Vload increases in the periods A and B (FIG. 10 part (d)). The filter circuit 3 has to be increased in size in order to reduce the oscillation and waveform distortion of the load voltage Vload occurring in this way.

The embodiments of the invention have been contrived in order to solve this kind of problem which the heretofore known technology has. That is, an object of the embodiments of the invention is to provide an inverter device which can output a voltage, an increase in the waveform distortion of which is suppressed, in the period in which the polarity of an output voltage and the polarity of an output current are different. This is achieved by causing a frequency, at which a switching element and a switch element are turned on and off, to drop in the period in which the polarity of the output voltage and the polarity of the output current are different.

One embodiment of the invention for achieving the heretofore described object is an inverter device including a power converter formed of first and second switching elements and a bidirectional switch. The first and second switching elements each include a diode connected in anti-parallel thereto. Further, the first and second switching elements are connected in series across a direct current power source. The bidirectional switch is configured by connecting first and second switch elements in anti-series or anti-parallel. Further, the bidirectional switch is connected between the connection point of the first and second switching elements and the intermediate potential point of the direct current power source.

Further, the power converter configured in this way includes an operation mode in which an alternating current voltage is output using the positive voltage of the direct current power source input via the first switching element, the negative voltage of the direct current power source input via the second switching element, and the intermediate voltage (a zero voltage) of the direct current power source input via the bidirectional switch. Further, in the period in which the polarity of an output voltage and the polarity of an output current are the same, the inverter device outputs a predetermined alternating current voltage by turning on and off predetermined two elements at a first frequency. Also, in the period in which the polarity of the output voltage and the polarity of the output current are different, the inverter device outputs a predetermined alternating current voltage by turning on and off predetermined two elements at a second frequency lower than the first frequency.

In the period in which the polarity of the output voltage and the polarity of the output current are both positive, the inverter device turns off the second switching element, turns on the first switch element, and alternately turns on and off the first switching element and the second switch element at the first frequency. Also, in the period in which the output voltage is positive and the output current is negative, the inverter device turns off the second switching element, turns on the first switch element, and alternately turns on and off the first switching element and the second switch element at the second frequency. Also, in the period in which the polarity of the output voltage and the polarity of the output current are both negative, the inverter device turns off the first switching element, turns on the second switch element, and alternately turns on and off the second switching element and the first switch element at the first frequency. Also, in the period in which the output voltage is negative and the output current is positive, the inverter device turns off the first switching element, turns on the second switch element, and alternately turns on and off the second switching element and the first switch element at the second frequency.

Another embodiment of the invention for achieving the heretofore described object is an inverter device including a power converter formed of first and second switching elements and a bidirectional switch. The first and second switching elements each include a diode connected in anti-parallel thereto. Further, the first and second switching elements are connected in series across a direct current power source. The bidirectional switch is configured by connecting third and fourth switch elements in anti-series or anti-parallel. The bidirectional switch is connected between the connection point of the first and second switching elements and one end of an alternating current power source. The other end of the alternating current power source is connected to the intermediate potential point of the direct current power source. Further, the size of the positive voltage and negative voltage of the direct current power source is set so as to be greater than the amplitude value of the voltage of the alternating current power source.

Further, the power converter configured in this way includes an operation mode in which an alternating current voltage is output using the positive voltage of the direct current power source input via the first switching element, the negative voltage of the direct current power source input via the second switching element, and the voltage of the alternating current power source input via the bidirectional switch. Further, in the period in which the polarity of an output voltage and the polarity of an output current are the same, the inverter device outputs a predetermined alternating current voltage by turning on and off predetermined two elements at a first frequency. Also, in the period in which the polarity of the output voltage and the polarity of the output current are different, the inverter device outputs a predetermined alternating current voltage by turning on and off predetermined two elements at a second frequency lower than the first frequency.

In the period in which the polarity of the output voltage and the polarity of the output current are both positive, the inverter device turns off the second switching element, turns on the third switch element, and alternately turns on and off the first switching element and the fourth switch element at the first frequency. Also, in the period in which the output voltage is positive and the output current is negative, the inverter device turns off the second switching element, turns on the third switch element, and alternately turns on and off the first switching element and the fourth switch element at the second frequency. Also, in the period in which the polarity of the output voltage and the polarity of the output current are both negative, the inverter device turns off the first switching element, turns on the fourth switch element, and alternately turns on and off the second switching element and the third switch element at the first frequency. Also, in the period in which the output voltage is negative and the output current is positive, the inverter device turns off the first switching element, turns on the fourth switch element, and alternately turns on and off the second switching element and the third switch element at the second frequency.

Another embodiment of the invention for achieving the heretofore described object is applied to an inverter device including a power converter formed of first and second switching elements and first and second bidirectional switches. The first and second switching elements each include a diode connected in anti-parallel thereto. Further, the first and second switching elements are connected in series across a direct current power source. The first bidirectional switch is configured by connecting first and second switch elements in anti-series or anti-parallel. Further, the first bidirectional switch is connected between the connection point of the first and second switching elements and the intermediate potential point of the direct current power source. The second bidirectional switch is configured by connecting third and fourth switch elements in anti-series or anti-parallel. Further, the second bidirectional switch is connected between the connection point of the first and second switching elements and one end of an alternating current power source. The other end of the alternating current power source is connected to the intermediate potential point of the direct current power source. Further, the size of the positive voltage and negative voltage of the direct current power source is set so as to be greater than the amplitude value of the voltage of the alternating current power source.

Further, the inverter device configured in this way includes a first operation mode in which an alternating current voltage is output using the positive voltage of the direct current power source input via the first switching element, the negative voltage of the direct current power source input via the second switching element, and the intermediate voltage (a zero voltage) of the direct current power source input via the first bidirectional switch. Further, in the first operation mode, in the period in which the polarity of an output voltage and the polarity of an output current are the same, the inverter device outputs a predetermined alternating current voltage by turning on and off predetermined two elements at a first frequency. Also, in the first operation mode, in the period in which the polarity of the output voltage and the polarity of the output current are different, the inverter device outputs a predetermined alternating current voltage by turning on and off predetermined two elements at a second frequency lower than the first frequency.

In the period in which the polarity of the output voltage and the polarity of the output current are both positive, the inverter device turns off the second switching element and the second bidirectional switch, turns on the first switch element, and alternately turns on and off the first switching element and the second switch element at the first frequency. Also, in the period in which the output voltage is positive and the output current is negative, the inverter device turns off the second switching element and the second bidirectional switch, turns on the first switch element, and alternately turns on and off the first switching element and the second switch element at the second frequency. Also, in the period in which the polarity of the output voltage and the polarity of the output current are both negative, the inverter device turns off the first switching element and the second bidirectional switch, turns on the second switch element, and alternately turns on and off the second switching element and the first switch element at the first frequency. Also, in the period in which the output voltage is negative and the output current is positive, the inverter device turns off the first switching element and the second bidirectional switch, turns on the second switch element, and alternately turns on and off the second switching element and the first switch element at the second frequency.

Another embodiment of the invention for achieving the heretofore described object is applied to an inverter device including a power converter formed of first and second switching elements and first and second bidirectional switches. The first and second switching elements each include a diode connected in anti-parallel thereto. Further, the first and second switching elements are connected in series across a direct current power source. The first bidirectional switch is configured by connecting first and second switch elements in anti-series or anti-parallel. Further, the first bidirectional switch is connected between the connection point of the first and second switching elements and the intermediate potential point of the direct current power source. The second bidirectional switch is configured by connecting third and fourth switch elements in anti-series or anti-parallel. Further, the second bidirectional switch is connected between the connection point of the first and second switching elements and one end of an alternating current power source. The other end of the alternating current power source is connected to the intermediate potential point of the direct current power source. Further, the size of the positive voltage and negative voltage of the direct current power source is set so as to be greater than the amplitude value of the voltage of the alternating current power source.

Further, the inverter device configured in this way includes a second operation mode in which an alternating current voltage is output using the positive voltage of the direct current power source input via the first switching element, the negative voltage of the direct current power source input via the second switching element, and the voltage of the alternating current power source input via the second bidirectional switch. Further, in the second operation mode, in the period in which the polarity of an output voltage and the polarity of an output current are the same, the inverter device outputs a predetermined alternating current voltage by turning on and off predetermined two elements at a first frequency. Also, in the second operation mode, in the period in which the polarity of the output voltage and the polarity of the output current are different, the inverter device outputs a predetermined alternating current voltage by turning on and off predetermined two elements at a second frequency lower than the first frequency.

In the period in which the polarity of the output voltage and the polarity of the output current are both positive, the inverter device turns off the second switching element and the first bidirectional switch, turns on the third switch element, and alternately turns on and off the first switching element and the fourth switch element at the first frequency. Also, in the period in which the output voltage is positive and the output current is negative, the inverter device turns off the second switching element and the first bidirectional switch, turns on the third switch element, and alternately turns on and off the first switching element and the fourth switch element at the second frequency. Also, in the period in which the polarity of the output voltage and the polarity of the output current are both negative, the inverter device turns off the first switching element and the first bidirectional switch, turns on the fourth switch element, and alternately turns on and off the second switching element and the third switch element at the first frequency. Also, in the period in which the output voltage is negative and the output current is positive, the inverter device turns off the first switching element and the first bidirectional switch, turns on the fourth switch element, and alternately turns on and off the second switching element and the third switch element at the second frequency.

In this way, the inverter devices according to the heretofore described embodiments, in the period in which the polarity of the output voltage and the polarity of the output current are different, cause a predetermined switching element and a predetermined switch element to perform an alternate on and off operation at the second frequency lower than the first frequency. As a result of this, the inverter devices can output a voltage, an increase in the waveform distortion of which is suppressed, in the period in which the polarity of the output voltage and the polarity of the output current are different.

BRIEF DESCRIPTION OF THE DRAWINGS

These and/or other aspects and advantages will become apparent and more readily appreciated from the following description of the embodiments, taken in conjunction with the accompanying drawings of which:

FIG. 9 is a chart for illustrating an operation of the inverter device when outputting a positive voltage.

FIG. 10 is a chart for illustrating the relationship between an output voltage and an output current when a power factor is lagging.

DESCRIPTION OF EMBODIMENTS

Figure 1:
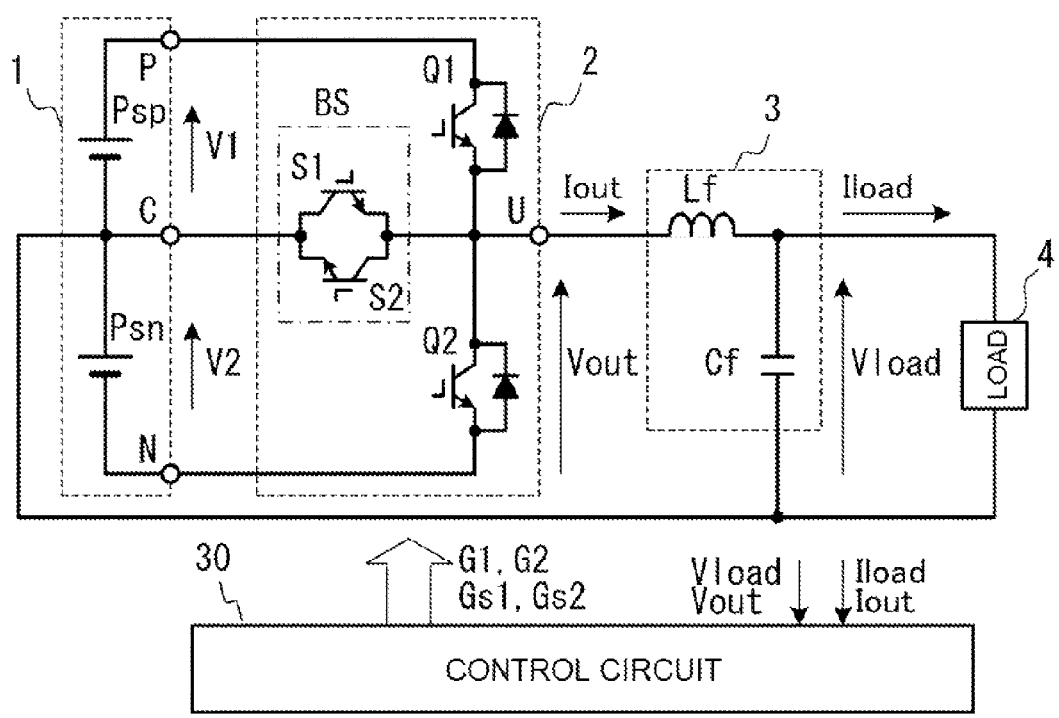
FIG. 1 is a diagram for illustrating a configuration of an inverter device to which an embodiment of the invention is applied.

Reference will now be made in detail to the embodiments, examples of which are illustrated in the accompanying drawings, wherein like reference numerals refer to the like elements throughout. Embodiments of the invention are described below by referring to the figures.

Figure 8:
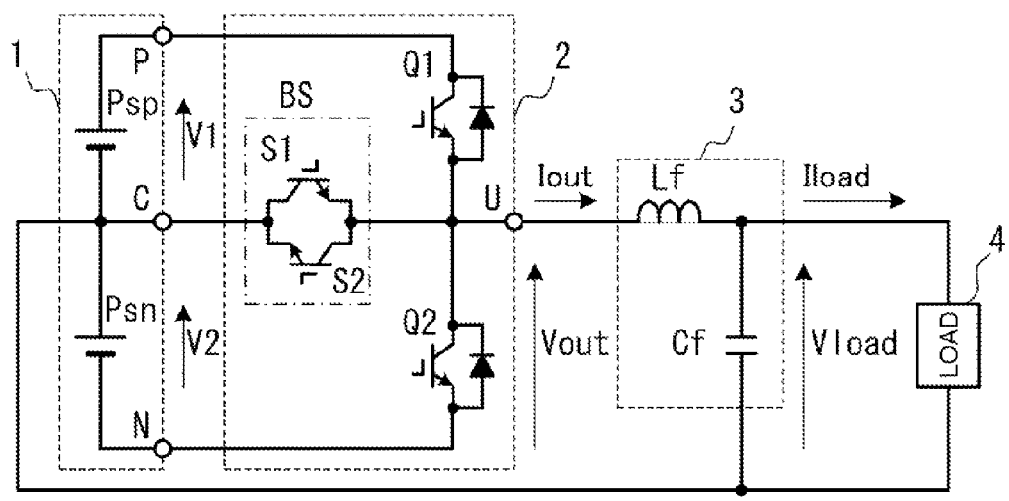
FIG. 8 is a diagram for illustrating a configuration of an inverter device according to a heretofore known technology.

A description will be given, using FIGS. 1 to 5, of a first embodiment of an inverter device. FIG. 1 shows an inverter device wherein a control circuit 30 is added to the inverter device shown in FIG. 8. That is, the circuit components other than the control circuit 30 are the same as those of the inverter device shown in FIG. 8. Consequently, a description thereof will be omitted.

Figure 2:
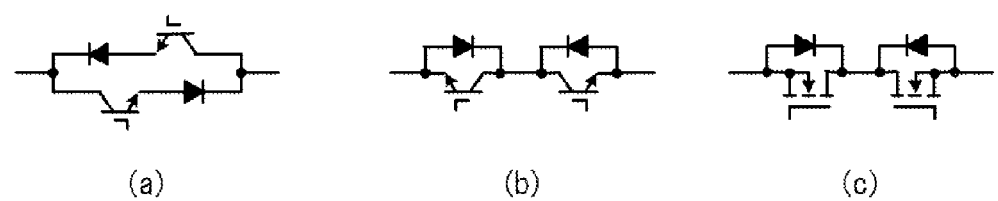
FIG. 2 shows diagrams for illustrating other configurations of the bidirectional switch shown in FIG. 1.

A bidirectional switch BS may be a circuit having one of the configurations shown in FIG. 2 parts (a) to (c), or a circuit having an equivalent function and advantageous effect. The same is true in other embodiments of the invention. FIG. 2 part (a) is a bidirectional switch configured by connecting two circuits, each of which has an Insulated Gate Bipolar Transistor (IGBT) and a diode connected in series, in anti-parallel. FIG. 2 part (b) is a bidirectional switch configured by connecting two IGBTs, to each of which a diode is connected in anti-parallel, in anti-series. FIG. 2 part (c) is a bidirectional switch configured by replacing the IGBTs with Metal Oxide Semiconductor Field Effect Transistors (MOSFETs) in FIG. 2 part (b).

Figure 3:
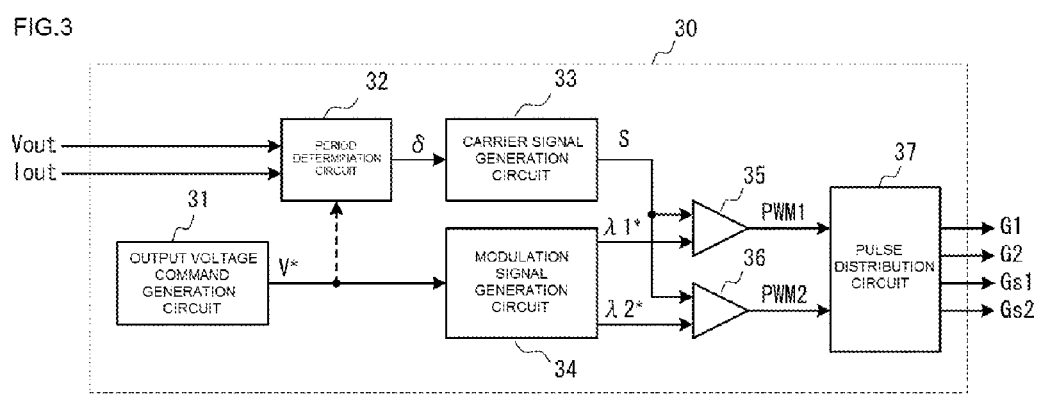
FIG. 3 is a diagram for illustrating an operation of the control circuit shown in FIG. 1.

FIG. 3 is a diagram showing a configuration of the control circuit 30. The control circuit 30 includes an output voltage command generation circuit 31, a period determination circuit 32, a carrier signal generation circuit 33, a modulation signal generation circuit 34, pulse width modulation circuits 35 and 36, and a pulse distribution circuit 37. Further, the outline of an operation of the control circuit 30 is as follows.

The output voltage command generation circuit 31 outputs a command for a voltage to be output by an inverter circuit 2 (an output voltage command V*). Detection signals of an output voltage Vout and output current Iout of the inverter circuit 2 are input into the period determination circuit 32. The period determination circuit 32, using the output voltage Vout and output current Iout, generates a period signal δ which has determined each period A to C. The period A is a period in which the output voltage Vout is positive and the output current Iout is negative. The period B is a period in which the output voltage Vout is negative and the output current Iout is positive. The period C is a period in which the polarity of the output voltage Vout and the polarity of the output current Iout are the same. The period signal δ may be generated using the output voltage command V* in place of the output voltage Vout. Hereafter, a description will be given, with the case of using the output voltage command V* taken for example, according to embodiments of the invention.

Figure 4:
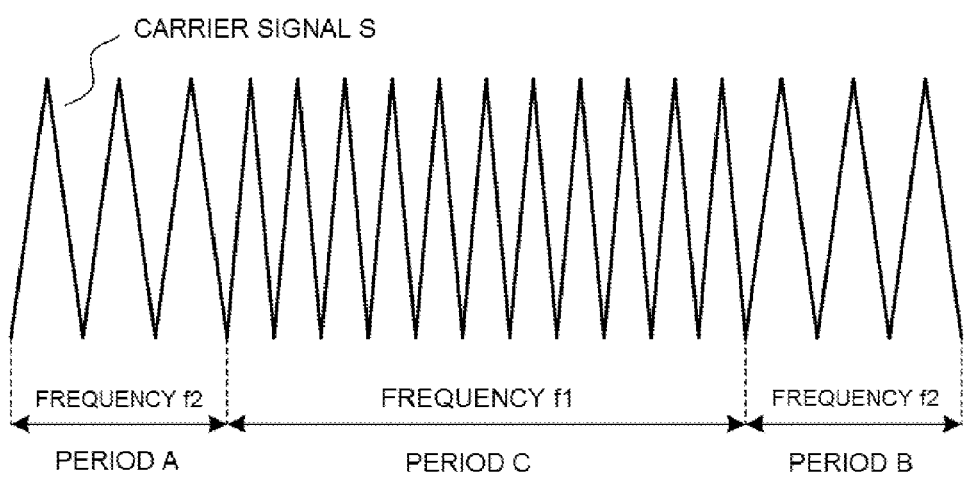
FIG. 4 is a chart for illustrating a carrier signal S shown in FIG. 3.

The carrier signal generation circuit 33, based on the period signal δ, generates a carrier signal S with a predetermined frequency (FIG. 4). Specifically, when the period signal δ is in the period C, the carrier signal generation circuit 33 generates a carrier signal S with a first frequency f1. Also, when the period signal δ is in the period A or the period B, the carrier signal generation circuit 33 generates a carrier signal S with a second frequency f2. The frequency f2 is set to be lower than the frequency f1.

The modulation signal generation circuit 34, based on the output voltage command V*, generates a first modulation signal λ1* and a second modulation signal λ2*. The pulse width modulation circuit 35, using the first modulation signal λ1* and the carrier signal S, generates a pulse-width modulated first signal (a PWM signal 1). The pulse width modulation circuit 36, using the second modulation signal λ2* and the carrier signal S, generates a pulse-width modulated second signal (a PWM signal 2). The pulse distribution circuit 37, using the PWM signal 1, generates control signals G1 and Gs2 of a switching element Q1 and switch element S2. Also, the pulse distribution circuit 37, using the PWM signal 2, generates control signals G2 and Gs1 of a switching element Q2 and switch element S1.

The control signal G1 of the switching element Q1 changes to H or L in synchronism with the PWM signal 1. Meanwhile, the control signal Gs2 of the switch element S2 is a signal wherein H and L of the PWM signal 1 are inverted and to which dormant periods Td are added. Also, the control signal G2 of the switching element Q2 changes to H or L in synchronism with the PWM signal 2. Meanwhile, the control signal Gs1 of the switch element S1 is a signal wherein H and L of the PWM signal 2 are inverted and to which dormant periods Td are added. The pulse of the PWM signals 1 and 2 and control signals G1, G2, Gs1, and Gs2 which are at H will hereafter be referred to also as the on pulse.

Figure 5:
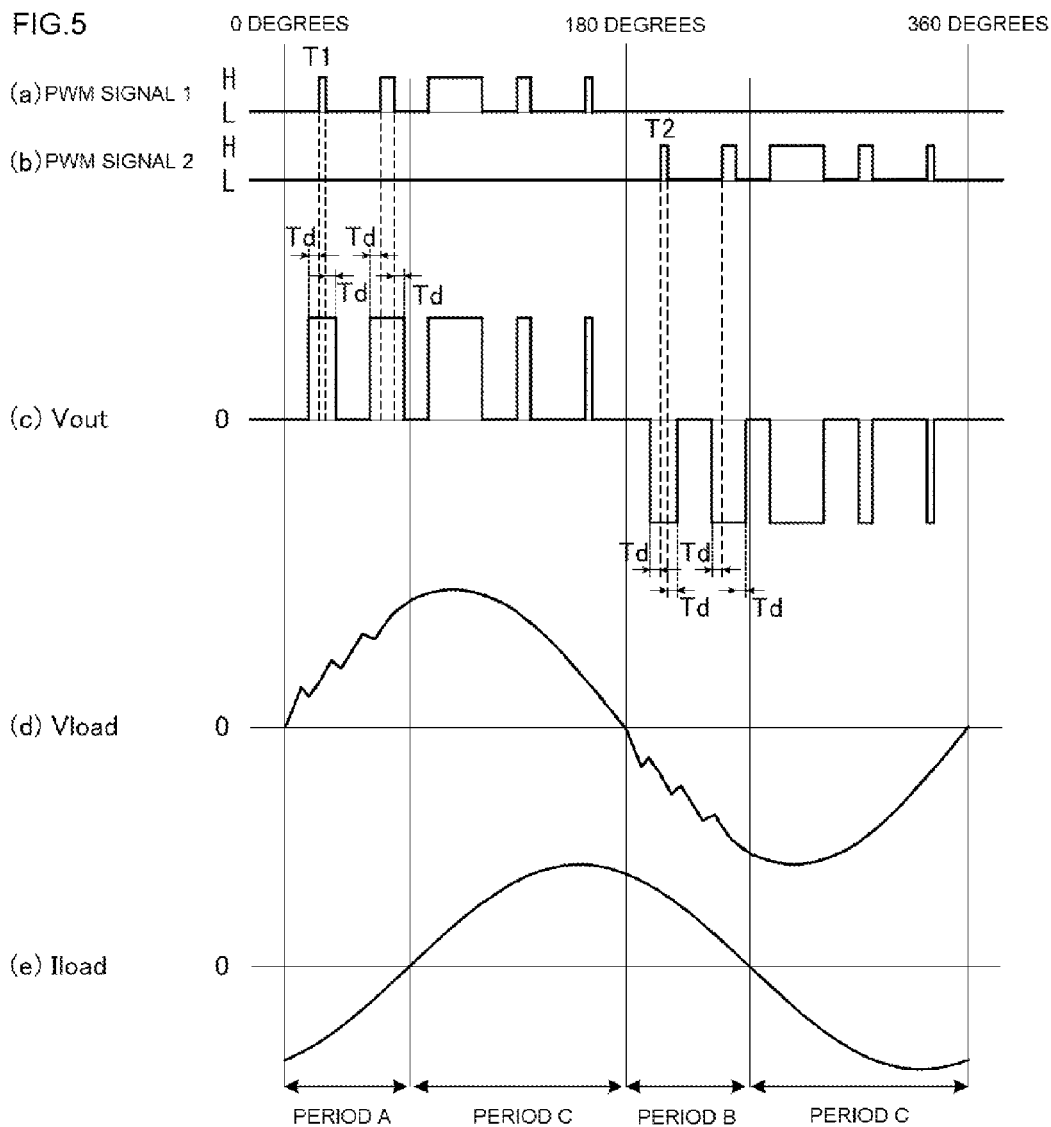
FIG. 5 is a chart for illustrating the relationship between the output voltage and output current of the inverter device shown in FIG. 1.

FIG. 5 is a chart for illustrating the relationship between the PWM signals 1 and 2 and the output voltage Vout. FIG. 5 part (a) shows a temporal change in the PWM signal 1 in one cycle of the output voltage Vout. Also, FIG. 5 part (b) shows a temporal change in the PWM signal 2 in one cycle of the output voltage Vout. The PWM signal 1 is a signal which is pulse-width modulated in the period in which the control angle is from 0 degrees to 180 degrees, and which is at L in the period in which the control angel is from 180 degrees to 360 degrees. Meanwhile, the PWM signal 2 is a signal which is at L in the period in which the control angle is from 0 degrees to 180 degrees, and which is pulse-width modulated in the period in which the control angle is from 180 degrees to 360 degrees.

When the inverter circuit 2 operates based on the heretofore described control signals, a pulse-width modulated pulse train voltage Vout is output between terminals U and C (FIG. 5 part (c)). That is, in the period C in which the output voltage command V* is positive and the output current Iout is positive, the inverter device alternately turns on and off the switching element Q1 and switch element S1 across the dormant periods Td at the frequency f1. By this operation, in the period C, a voltage Vout obtained by combining the intermediate voltage (a zero voltage Vz) of a direct current power source 1 and a voltage, which is a pulse train voltage generated in response to the PWM signal 1 and whose amplitude is equivalent to that of a positive voltage V1 of the direct current power source 1, is output between terminals U and V. Also, in the period C in which the output voltage command V* is negative and the output current Iout is negative, the inverter device alternately turns on and off the switching element Q2 and switch element S2 across the dormant periods Td at the frequency f1. By this operation, in the period C, a voltage Vout obtained by combining the intermediate voltage (zero voltage Vz) of the direct current power source 1 and a voltage, which is a pulse train voltage generated in response to the PWM signal 2 and whose amplitude is equivalent to that of a negative voltage V2 of the direct current power source 1, is output between the terminals U and V.

Meanwhile, in the period A in which the output voltage command V* is positive and the output current Iout is negative, the inverter device alternately turns on and off the switching element Q1 and switch element S1 across the dormant periods Td at the frequency f2. By this operation, in the period A, a voltage Vout obtained by combining the intermediate voltage (zero voltage Vz) of the direct current power source 1 and a voltage, which is a pulse train voltage generated in response to the PWM signal 1 and whose amplitude is equivalent to that of the positive voltage V1 of the direct current power source 1, is output between the terminals U and V. Also, in the period B in which the output voltage command V* is negative and the output current Iout is positive, the inverter device alternately turns on and off the switching element Q2 and switch element S2 across the dormant periods Td at the frequency f2. By this operation, in the period B, a voltage Vout obtained by combining the intermediate voltage (zero voltage Vz) of the direct current power source 1 and a voltage, which is a pulse train voltage generated in response to the PWM signal 2 and whose amplitude is equivalent to that of the negative voltage V2 of the direct current power source 1, is output between the terminals U and V.

Herein, the width of the first on pulse of the PWM signal 1 in the period A is T1 (FIG. 5 part (a)). The pulse width of the output voltage Vout corresponding to the on pulse is (T1+2Td) because the dormant periods Td are added to the pulse width (FIG. 5 part (c)). Meanwhile, the width of the first pulse of the PWM signal 2 in the period B is T2 (FIG. 5 part (b)). The pulse width of the output voltage Vout corresponding to the on pulse is (T2+2Td) because the dormant periods Td are added to the pulse width (FIG. 5 part (c)).

As heretofore described, the frequency f2 is lower than the frequency f1. Consequently, the PWM signal 1 generated in the period A by the modulation signal generation circuit 34 is a signal whose on pulse is wider than the on pulse of the PWM signal 1 in the period A shown in FIG. 10 part (a). In the same way, the PWM signal 2 generated in the period B by the modulation signal generation circuit 34 is a signal whose on pulse is wider than the on pulse of the PWM signal 2 in the period B shown in FIG. 10 part (b). Therefore, the control signals G1 and G2 of the switching elements Q1 and Q2 in this embodiment are signals which are wider than the control signals of the switching elements Q1 and Q2 shown in FIG. 8.

Consequently, in this embodiment, the proportion of the dormant periods Td to the pulse width of the output voltage Vout in the period A decreases compared with in a heretofore known technology. As a result of this, the output voltage Vout in this embodiment in the period A forms a waveform closer to that of the PWM signal 1 than the output voltage Vout shown in FIG. 10 part (c). Therefore, the amount of harmonic included in the output voltage Vout in this embodiment in the period A is reduced compared with in the heretofore known technology.

Also, in this embodiment, the proportion of the dormant periods Td to the pulse width of the output voltage Vout in the period B decreases compared with in the heretofore known technology. As a result of this, the output voltage Vout in this embodiment in the period B forms a waveform closer to that of the PWM signal 2 than the output voltage Vout shown in FIG. 10 part (c). Therefore, the amount of harmonic included in the output voltage Vout in this embodiment in the period B is reduced compared with in the heretofore known technology.

That is, according to this embodiment, the output voltages Vout in the period A and period B form a waveform with a lower distortion rate than the output voltage Vout shown in FIG. 10 part (c). Therefore, a load voltage Vload obtained by removing a harmonic component with the filter circuit 3 forms a waveform closer to that of a sine wave than the load voltage Vload shown in FIG. 10 part (d) (FIG. 5 part (d)).

Hereafter, consideration will be given to the size of the output voltage Vout in the period A with the voltages V1 and V2 of the direct current power source 1 as 400V, the frequency f1 as 20 kHz, the dormant periods Td as 1 μs, and the output voltage command V* in the period A as 4V. In this case, a cycle Tsc of the carrier signal S in the period C is 50 μs.

Firstly, in the heretofore known technology, the frequency f2 of the carrier signal S in the period A is the same as the frequency f1 in the period C. Consequently, a cycle Tsa of the carrier signal S is 50 μs. Therefore, the width of the on pulse of the PWM signal 1 when the output voltage command V* is 4V is 0.5 μs (=(50 μs×4V)/400V). Then, as the dormant periods Td are 1 μs, the output voltage Vout is 20V (=400V×((0.5 μs+2×1 μs)/50 μs)).

Meanwhile, the frequency f2 of the carrier signal S in the period A in this embodiment is set to 5 kHz lower than the frequency f1. In this case, the cycle Tsa of the carrier signal S is 200 μs. Therefore, the width of the on pulse of the PWM signal 1 when the output voltage command V* is 4V is 2 μs (=(200 μs×4V)/400V). Then, as the dormant periods Td is 1 μs, the output voltage Vout is 8V (=400V×((2 μs+2×1 μs)/200 μs)).

That is, when attempting to output a voltage of 4V, a voltage of 20V is output in the heretofore known technology while the output voltage in this embodiment is reduced to 8V. Consequently, the load voltage Vload in this embodiment obtained by removing the harmonic component with the filter circuit 3 forms a waveform closer to that of a sine wave than the load voltage Vload according to the heretofore known technology. The advantageous effect that the output voltage becomes closer to a command value in this embodiment is the same as in the period B.

Figure 6:
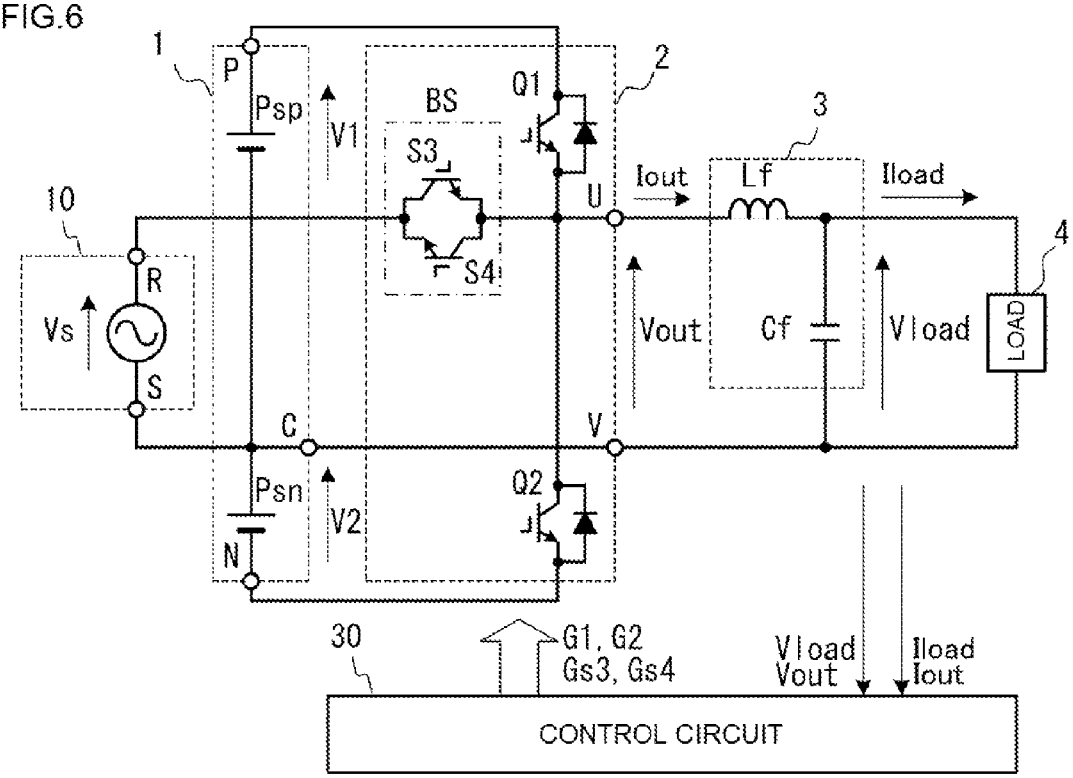
FIG. 6 is a diagram for illustrating another configuration of the inverter device to which an embodiment of the invention is applied.

Next, a description will be given, using FIG. 6, of a second embodiment of the inverter device. FIG. 6 shows an inverter device wherein an alternating current power source 10 is added to the inverter device shown in FIG. 1. Further, a bidirectional switch BS in this embodiment is connected between an output terminal U and a terminal R of the alternating current power source 10. A terminal S of the alternating current power source 10 is connected to a neutral terminal C of the direct current power source 1. Also, in this embodiment, the size of the positive voltage V1 and negative voltage V2 of the direct current power source 1 is set so as to be greater than the amplitude value of a voltage Vs of the alternating current power source 10. As the configurations of the direct current power source 1, the inverter circuit 2, the filter circuit 3, a load 4, and the control circuit 30 are the same as in the first embodiment, a description thereof will be omitted. Further, the control circuit 30 performs the same operation as in the case of the first embodiment.

The bidirectional switch BS in this embodiment is a bidirectional switch having the same configuration and function as the bidirectional switch BS in the first embodiment. However, in order to make a descriptive distinction, reference sign S3 and reference sign S4 are given to two switch elements in this embodiment.

In the period C in which the output voltage command V* is positive and the output current Iout is positive, the inverter device according to this embodiment alternately turns on and off the switching element Q1 and the switch element S3 across the dormant periods Td at the frequency f1. By this operation, in the period C, a voltage Vout obtained by combining the voltage Vs of the alternating current power source 10 and a voltage, which is a pulse train voltage generated in response to the PWM signal 1 and whose amplitude is equivalent to that of the positive voltage V1 of the direct current power source 1, is output between the terminals U and V. Also, in the period C in which the output voltage command V* is negative and the output current Iout is negative, the inverter device alternately turns on and off the switching element Q2 and the switch element S4 across the dormant periods Td at the frequency f1. By this operation, in the period C, a voltage Vout obtained by combining the voltage Vs of the alternating current power source 10 and a voltage, which is a pulse train voltage generated in response to the PWM signal 2 and whose amplitude is equivalent to that of the negative voltage V2 of the direct current power source 1, is output between the terminals U and V.

Meanwhile, in the period A in which the output voltage command V* is positive and the output current Iout is negative, the inverter device alternately turns on and off the switching element Q1 and the switch element S3 across the dormant periods Td at the frequency f2 lower than the frequency f1. By this operation, in the period A, a voltage Vout obtained by combining the voltage Vs of the alternating current power source 10 and a voltage, which is a pulse train voltage generated in response to the PWM signal 1 and whose amplitude is equivalent to that of the positive voltage V1 of the direct current power source 1, is output between the terminals U and V. Also, in the period B in which the output voltage command V* is negative and the output current Iout is positive, the inverter device alternately turns on and off the switching element Q2 and the switch element S4 across the dormant periods Td at the frequency f2. By this operation, in the period B, a voltage Vout obtained by combining the voltage Vs of the alternating current power source 10 and a voltage, which is a pulse train voltage generated in response to the PWM signal 2 and whose amplitude is equivalent to that of the negative voltage V2 of the direct current power source 1, is output between the terminals U and V.

As heretofore described, the frequency f2 is lower than the frequency f1. Consequently, in the periods A and B, the inverter device can reduce the proportion of the dormant periods Td to the pulse width of the pulse voltage combined with the voltage Vs of the alternating current power source 10, compared with when caused to operate at the frequency f1, in the same way as in the first embodiment. As a result of this, in this embodiment, the amount of harmonic included in the output voltages Vout in the periods A and B is reduced compared with when operating at the frequency f1.

That is, according to this embodiment, the output voltages Vout in the period A and period B form a waveform with a lower distortion rate than when operating at the frequency f1. Therefore, a load voltage Vload obtained by removing a harmonic component with the filter circuit 3 forms a waveform closer to that of a sine wave when operating at the frequency f1.

Figure 7:
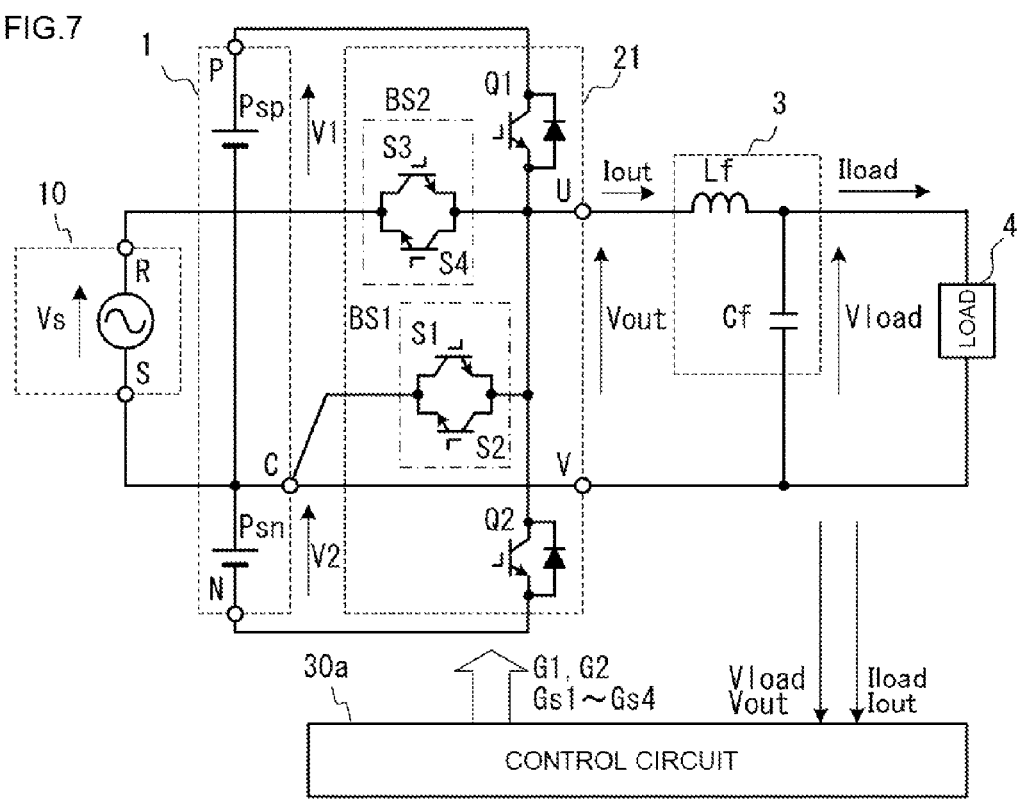
FIG. 7 is a diagram for illustrating another configuration of the inverter device to which an embodiment of the invention is applied.

Next, a description will be given, using FIG. 7, of a third embodiment of the inverter device. The inverter device according to this embodiment adopts a configuration wherein the inverter devices according to the first and second embodiments are combined. In this embodiment, an inverter circuit 21 generates the output voltage Vout. In the inverter circuit 21, the reference sign of a bidirectional switch corresponding to that of the first embodiment is set as BS1, and the reference sign of a bidirectional switch corresponding to that of the second embodiment is set as BS2. A control circuit 30a generates the control signal of the inverter circuit 21. As the configurations of the direct current power source 1, filter circuit 3, and load 4 are the same as in the first embodiment, a description thereof will be omitted.

The inverter circuit 21 according to this embodiment is formed of the switching elements Q1 and Q2, bidirectional switch BS1 (first bidirectional switch), and bidirectional switch BS2 (second bidirectional switch). The switching elements Q1 and Q2 are connected in series and connected across the direct current power source 1. The connection point of the switching elements Q1 and Q2 is the output terminal U which outputs an alternating current voltage. The bidirectional switch BS1 is configured by connecting the switch elements S1 and S2 in anti-parallel. The bidirectional switch BS1 is connected between the output terminal U and neutral terminal C. The bidirectional switch BS2 is configured by connecting the switch elements S3 and S4 in anti-parallel. The bidirectional switch BS2 is connected between the output terminal U and the terminal R of the alternating current power source 10. The terminal S of the alternating current power source 10 is connected to the neutral terminal C of the direct current power source 1. Also, in this embodiment, the size of the positive voltage V1 and negative voltage V2 of the direct current power source 1 is set so as to be greater than the amplitude value of the voltage Vs of the alternating current power source 10.

The inverter device according to this embodiment has at least an operation mode 1 (a first operation mode) and an operation mode 2 (a second operation mode). The operation mode 1 is an operation mode in which an alternating current voltage is output using the positive voltage V1 and negative voltage V2 of the direct current power source 1 and the intermediate voltage (zero voltage Vz). The operation mode 2 is an operation mode in which an alternating current voltage is output using the positive voltage V1 and negative voltage V2 of the direct current power source 1 and the voltage Vs of the alternating current power source 10.

Firstly, when operating in the operation mode 1, the inverter device carries out the same operation as the inverter device according to the first embodiment.

That is, when in the period C in which the polarity of the output voltage command V* and the polarity of the output current Iout are positive, the inverter device turns off the bidirectional switch BS2, and alternately turns on and off the switching element Q1 and switch element S1 across the dormant periods Td at the frequency f1. Also, when in the period C in which the polarity of the output voltage command V* and the polarity of the Iout are negative, the inverter device turns off the bidirectional switch BS2, and alternately turns on and off the switching element Q2 and switch element S2 across the dormant periods Td at the frequency f1.

Meanwhile, when in the period A in which the output voltage command V* is positive and the Iout is negative, the inverter device turns off the bidirectional switch BS2 and alternately turns on and off the switching element Q1 and switch element S1 across the dormant periods Td at the second frequency f2 lower than the frequency f1. Also, when in the period B in which the output voltage command V* is negative and the Iout is positive, the inverter device turns off the bidirectional switch BS2, and alternately turns on and off the switching element Q2 and switch element S2 across the dormant periods Td at the frequency f2.

By this operation, the inverter device can output between the terminals U and V a voltage Vout obtained by combining the zero voltage Vz and a voltage which is a pulse train voltage generated in response to the PWM signal 1 and whose amplitude is equivalent to that of the positive voltage V1 or negative voltage V2 of the direct current power source 1. As heretofore described, the frequency f2 is lower than the frequency f1. Consequently, by operating at the frequency f2 in the periods A and B, the inverter device can reduce the proportion of the dormant periods Td to the pulse width of the output voltage Vout, compared with when caused to operate at the frequency f1, in the same way as in the first embodiment. As a result of this, when the inverter device operates in the operation mode 1, the amount of harmonic included in the output voltages Vout in the periods A and B is reduced compared with when operating at the frequency f1.

Consequently, according to this embodiment, the output voltages Vout in the period A and period B in the operation mode 1 form a waveform with a lower distortion rate than the output voltage Vout shown in FIG. 10 part (c). Therefore, the load voltage Vload obtained by removing a harmonic component with the filter circuit 3 forms a waveform closer to that of a sine wave than the load voltage Vload shown in FIG. 10 part (d).

Next, when operating in the operation mode 2, the inverter device operates in the same way as in the second embodiment.

That is, when in the period C in which the polarity of the output voltage command V* and the polarity of the output current Iout are positive, the inverter device turns off the bidirectional switch BS1, and alternately turns on and off the switching element Q1 and switch element S3 across the dormant periods Td at the frequency f1. Also, when in the period C in which the polarity of the output voltage command V* and the polarity of the output current Iout are negative, the inverter device turns off the bidirectional switch BS1, and alternately turns on and off the switching element Q2 and switch element S4 across the dormant periods Td at the frequency f1. By this operation, in the period C, a voltage Vout obtained by combining the voltage Vs of the alternating current power source 10 and a voltage, which is a pulse train voltage generated in response to the PWM signal 1 and whose amplitude is equivalent to that of the positive voltage V1 or negative voltage V2 of the direct current power source 1, is output between the terminals U and V.

Meanwhile, when in the period A in which the output voltage command V* is positive and the output current Iout is negative, the inverter device turns off the bidirectional switch BS1, and alternately turns on and off the switching element Q1 and switch element S3 across the dormant periods Td at the frequency f2 lower than the frequency f1. Also, when in the period B in which the output voltage command V* is negative and the output current Iout is positive, the inverter device turns off the bidirectional switch BS1, and alternately turns on and off the switching element Q2 and switch element S4 across the dormant periods Td at the frequency f2.

By operating at the frequency f2 in the periods A and B in this way, the inverter device can reduce the proportion of the dormant periods Td to the pulse width of a pulse voltage combined with the voltage Vs of the alternating current power source 10, compared with when operating at the frequency f1, in the same way as in the second embodiment. As a result of this, when the inverter device operates in the operation mode 2, the amount of harmonic included in the output voltages Vout in the periods A and B is reduced compared with in the case of the heretofore known technology which operates at the frequency f1.

That is, with the inverter device, when operating in the operation mode 2, the output voltages Vout in the period A and period B form a waveform with a lower distortion rate than when operating at the frequency f1. Therefore, the load voltage Vload obtained by removing a harmonic component with the filter circuit 3 forms a waveform closer to that of a sine wave than when operating at the frequency f1.

Embodiments of the invention can be applied to a power conversion device, such as a momentary voltage drop compensation device or an uninterruptible power supply device, which supplies an alternating current voltage to a load.

REFERENCE SIGNS LIST

1 Direct current power source
2, 21 Inverter circuit
3 Filter circuit
4 Load
10 Alternating current power source
30, 30a Control circuit Although a few embodiments have been shown and described, it would be appreciated by those skilled in the art that changes may be made in these embodiments without departing from the principles and spirit of the invention, the scope of which is defined in the claims and their equivalents.

What is claimed is:

1. An inverter device, comprising:
first and second switching elements, each of which is connected to a diode in anti-parallel, the first and second switching elements connected in series across a direct current power source; and
a bidirectional switch, configured by connecting a first switch element and a second switch element in anti-series or anti-parallel, an end of the bidirectional switch connected to a connection point of the first and second switching elements, and an other end connected to an intermediate potential point of the direct current power source, wherein
when in an operation mode in which a predetermined alternating current voltage is output using a positive voltage of the direct current power source input via the first switching element, a negative voltage of the direct current power source input via the second switching element, and an intermediate voltage of the direct current power source input via the bidirectional switch,
in a period in which a polarity of an output voltage and a polarity of an output current are the same, two predetermined elements are alternately turned on and off at a first frequency, and
in a period in which the polarity of the output voltage and the polarity of the output current are different, the two predetermined elements are alternately turned on and off at a second frequency lower than the first frequency.

2. The inverter device according to claim 1, wherein each of the periods is set using a polarity of an alternating voltage output command and a polarity of an output current, in place of the polarity of the output voltage and the polarity of the output current.

3. The inverter device according to claim 1, wherein when in the operation mode in which the predetermined alternating current voltage is output,
in a period in which the polarity of the output voltage and the polarity of the output current are positive, the second switching element is turned off, the first switch element is turned on, and the first switching element and the second switch element are alternately turned on and off at the first frequency,
in a period in which the output voltage is positive and the output current is negative, the second switching element is turned off, the first switch element is turned on, and the first switching element and the second switch element are alternately turned on and off at the second frequency,
in a period in which the polarity of the output voltage and the polarity of the output current are negative, the first switching element is turned off, the second switch element is turned on, and the second switching element and the first switch element are alternately turned on and off at the first frequency, and
in a period in which the output voltage is negative and the output current is positive, the first switching element is turned off, the second switch element is turned on, and the second switching element and the first switch element are alternately turned on and off at the second frequency.

4. The inverter device according to claim 3, wherein each of the periods is set using a polarity of an alternating voltage output command and a polarity of an output current, in place of the polarity of the output voltage and the polarity of the output current.

5. An inverter device, comprising:
first and second switching elements, each of which is connected to a diode in anti-parallel, the first and second switching elements connected in series across a direct current power source; and
a bidirectional switch, configured by connecting a third switch element and a fourth switch element in anti-series or anti-parallel, an end of the bidirectional switch connected to a connection point of the first and second switching elements, and an other end connected to an end of an alternating current power source, wherein
an other end of the alternating current power source is connected to an intermediate potential point of the direct current power source, and a size of a positive voltage and a negative voltage of the direct current power source is set to be greater than an amplitude value of a voltage of the alternating current power source, and
when in an operation mode in which a predetermined alternating current voltage is output using the positive voltage of the direct current power source input via the first switching element, the negative voltage of the direct current power source input via the second switching element, and the voltage of the alternating current power source input via the bidirectional switch, in a period in which a polarity of an output voltage and a polarity of an output current are the same, two predetermined elements are alternately turned on and off at a first frequency, and in a period in which the polarity of the output voltage and the polarity of the output current are different, the two predetermined elements are alternately turned on and off at a second frequency lower than the first frequency.

6. The inverter device according to claim 5, wherein each of the periods is set using a polarity of an alternating voltage output command and a polarity of an output current, in place of the polarity of the output voltage and the polarity of the output current.

7. The inverter device according to claim 5, wherein when in the operation mode in which the predetermined alternating current voltage is output, in a period in which the polarity of the output voltage and the polarity of the output current are positive, the second switching element is turned off, the third switch element is turned on, and the first switching element and the fourth switch element are alternately turned on and off at the first frequency, in a period in which the output voltage is positive and the output current is negative, the second switching element is turned off, the third switch element is turned on, and the first switching element and the fourth switch element are alternately turned on and off at the second frequency, in a period in which the polarity of the output voltage and the polarity of the output current are negative, the first switching element is turned off, the fourth switch element is turned on, and the second switching element and the third switch element are alternately turned on and off at the first frequency, and in a period in which the output voltage is negative and the output current is positive, the first switching element is turned off, the fourth switch element is turned on, and the second switching element and the third switch element are alternately turned on and off at the second frequency.

8. The inverter device according to claim 7, wherein each of the periods is set using a polarity of an alternating voltage output command and a polarity of an output current, in place of the polarity of the output voltage and the polarity of the output current.

9. An inverter device, comprising:

first and second switching elements, each of which is connected to a diode in anti-parallel, the first and second switching elements connected in series across a direct current power source;

a first bidirectional switch, configured by connecting a first switch element and a second switch element in anti-series or anti-parallel, and connected between a connection point of the first and second switching elements and an intermediate potential point of the direct current power source; and a second bidirectional switch, configured by connecting a third switch element and a fourth switch element in anti-series or anti-parallel, and connected between the connection point of the first and second switching elements and an end of an alternating current power source, wherein an other end of the alternating current power source is connected to the intermediate potential point of the direct current power source, and a size of a positive voltage and a negative voltage of the direct current power source is set to be greater than an amplitude value of a voltage of the alternating current power source, and when in a first operation mode in which a predetermined alternating current voltage is output using the positive voltage of the direct current power source input via the first switching element, the negative voltage of the direct current power source input via the second switching element, and an intermediate voltage of the direct current power source input via the second bidirectional switch, in a period in which a polarity of an output voltage and a polarity of an output current are the same, two predetermined elements are turned on and off at a first frequency, and in a period in which the polarity of the output voltage and the polarity of the output current are different, the two predetermined elements are turned on and off at a second frequency lower than the first frequency.

10. The inverter device according to claim 9, wherein each of the periods is set using a polarity of an alternating voltage output command and a polarity of an output current, in place of the polarity of the output voltage and the polarity of the output current.

11. The inverter device according to claim 9, wherein when in the first operation mode in which the predetermined alternating current voltage is output, in a period in which the polarity of the output voltage and the polarity of the output current are positive, the second switching element and the second bidirectional switch are turned off, the first switch element is turned on, and the first switching element and the second switch element are alternately turned on and off at the first frequency, in a period in which the output voltage is positive and the output current is negative, the second switching element and the second bidirectional switch are turned off, the first switch element is turned on, and the first switching element and the second switch element are alternately turned on and off at the second frequency, in a period in which the polarity of the output voltage and the polarity of the output current are negative, the first switching element and the second bidirectional switch are turned off, the second switch element is turned on, and the second switching element and the first switch element are alternately turned on and off at the first frequency, and in a period in which the output voltage is negative and the output current is positive, the first switching element and the second bidirectional switch are turned off while the second switch element is turned on, and the second switching element and the first switch element are alternately turned on and off at the second frequency.

12. The inverter device according to claim 11, wherein each of the periods is set using a polarity of an alternating voltage output command and a polarity of an output current, in place of the polarity of the output voltage and the polarity of the output current.

13. An inverter device, comprising:

first and second switching elements, each of which is connected to a diode in anti-parallel, the first and second switching elements connected in series across a direct current power source;

a first bidirectional switch, configured by connecting a first switch element and second switch element in anti-series or anti-parallel, and connected between a connection point of the first and second switching elements and an intermediate potential point of the direct current power source; and a second bidirectional switch, configured by connecting a third switch element and a fourth switch element in anti-series or anti-parallel, and connected between the connection point of the first and second switching elements and an end of an alternating current power source, wherein an other end of the alternating current power source is connected to the intermediate potential point of the direct current power source, and a size of a positive voltage and a negative voltage of the direct current power source is set to be greater than an amplitude value of a voltage of the alternating current power source, and when in a second operation mode in which a predetermined alternating current voltage is output using the positive voltage of the direct current power source input via the first switching element, the negative voltage of the direct current power source input via the second switching element, and the voltage of the alternating current power source input via the second bidirectional switch, in a period in which a polarity of an output voltage and a polarity of an output current are the same, two predetermined elements are turned on and off at a first frequency, and in a period in which the polarity of the output voltage and the polarity of the output current are different, the two predetermined elements are turned on and off at a second frequency lower than the first frequency.

14. The inverter device according to claim 13, wherein each of the periods is set using a polarity of an alternating voltage output command and a polarity of an output current, in place of the polarity of the output voltage and the polarity of the output current.

15. The inverter device according to claim 13, wherein when in the second operation mode in which the predetermined alternating current voltage is output, in a period in which the polarity of the output voltage and the polarity of the output current are positive, the second switching element and the first bidirectional switch are turned off, the third switch element is turned on, and the first switching element and the fourth switch element are alternately turned on and off at the first frequency, in a period in which the output voltage is positive and the output current is negative, the second switching element and the first bidirectional switch are turned off, the third switch element is turned on, and the first switching element and the fourth switch element are alternately turned on and off at the second frequency, in a period in which the polarity of the output voltage and the polarity of the output current are negative, the first switching element and the first bidirectional switch are turned off, the fourth switch element is turned on, and the second switching element and the third switch element are alternately turned on and off at the first frequency, and in a period in which the output voltage is negative and the output current is positive, the first switching element and the first bidirectional switch are turned off, the fourth switch element is turned on, and the second switching element and the third switch element are alternately turned on and off at the second frequency.

16. The inverter device according to claim 15, wherein each of the periods is set using a polarity of an alternating voltage output command and a polarity of an output current, in place of the polarity of the output voltage and the polarity of the output current.

\* \* \* \* \*